United States Patent
Hyde, Jr.

[11] Patent Number: 6,038,553
[45] Date of Patent: Mar. 14, 2000

[54] SELF SERVICE METHOD OF AND SYSTEM FOR CASHING CHECKS

[75] Inventor: Thomas A. Hyde, Jr., Dallas, Tex.

[73] Assignee: Affiliated Computer Services, Inc., Dallas, Tex.

[21] Appl. No.: 08/933,413

[22] Filed: Sep. 19, 1997

[51] Int. Cl.[7] ................................................ G06F 17/60
[52] U.S. Cl. ........................... 705/45; 705/43; 235/379; 382/137; 382/138; 382/139; 382/140
[58] Field of Search .................. 705/1, 30, 35, 705/40, 45, 39; 235/380, 379, 375; 236/379; 364/400; 902/3, 5

[56] References Cited

U.S. PATENT DOCUMENTS

| | | | |
|---|---|---|---|
| 3,588,449 | 6/1971 | Paterson | 235/61.7 |
| 3,705,384 | 12/1972 | Wahlberg | 340/149 |
| 3,784,790 | 1/1974 | Hatanaka et al. | 235/61.7 |
| 3,798,603 | 3/1974 | Wahlberg | 340/149 |
| 3,876,864 | 4/1975 | Clark et al. | 235/61.7 B |
| 3,896,266 | 7/1975 | Waterbury | 179/1 |
| 3,943,335 | 3/1976 | Kinker et al. | 235/61.7 |
| 4,109,238 | 8/1978 | Creekmore | 340/149 A |
| 4,317,957 | 3/1982 | Sendrow | 178/22.08 |
| 4,321,672 | 3/1982 | Braun et al. | 364/408 |
| 4,580,040 | 4/1986 | Granzow et al. | 235/379 |
| 4,617,457 | 10/1986 | Granzow et al. | 235/379 |
| 4,993,068 | 2/1991 | Piosenka et al. | 380/23 |
| 5,023,782 | 6/1991 | Lutz et al. | 364/405 |
| 5,220,501 | 6/1993 | Lawlor et al. | 364/408 |
| 5,265,008 | 11/1993 | Benton et al. | 364/408 |
| 5,367,561 | 11/1994 | Adler et al. | 379/93 |
| 5,386,103 | 1/1995 | DeBan et al. | 235/379 |
| 5,592,377 | 1/1997 | Lipkin | 395/242 |
| 5,751,841 | 5/1998 | Leong et al. | 382/137 |
| 5,751,842 | 5/1998 | Riach et al. | 382/137 |
| 5,832,463 | 11/1998 | Funk | 705/35 |
| 5,832,464 | 11/1998 | Houvener et al. | 705/45 |
| 5,890,141 | 3/1999 | Carney et al. | 705/45 |
| 5,897,625 | 4/1999 | Gustin et al. | 705/43 |
| 5,898,155 | 4/1999 | Imai et al. | 235/379 |
| 5,898,157 | 4/1999 | Mangili et al. | 235/380 |
| 5,925,865 | 7/1999 | Steger | 235/379 |
| 5,940,811 | 8/1999 | Norris | 705/38 |
| 5,940,844 | 8/1999 | Cahill et al. | 707/526 |

FOREIGN PATENT DOCUMENTS

| | | | |
|---|---|---|---|
| 9835298 | 2/1998 | WIPO | G06F 15/20 |

*Primary Examiner*—Eric W. Stamber
*Assistant Examiner*—John Campa
*Attorney, Agent, or Firm*—Herbert J. Hammond

[57] ABSTRACT

An automated self service method of and system for cashing checks, typically without human intervention. The system includes a check cashing database that contains customer records for registered customers. A plurality of administration modules are provided with which individuals may register themselves and their checks and communicate with customer service representatives. A check cashing server communicates with the check cashing transaction modules. The check cashing server receives check cashing requests from the check cashing transaction modules. The check cashing server processes check requests by comparing information in the request with criteria derived from the check cashing database. If the check request satisfies the criteria, the check cashing server, without human action or intervention, instructs the check cashing transaction module to dispense cash to the customer.

24 Claims, 9 Drawing Sheets

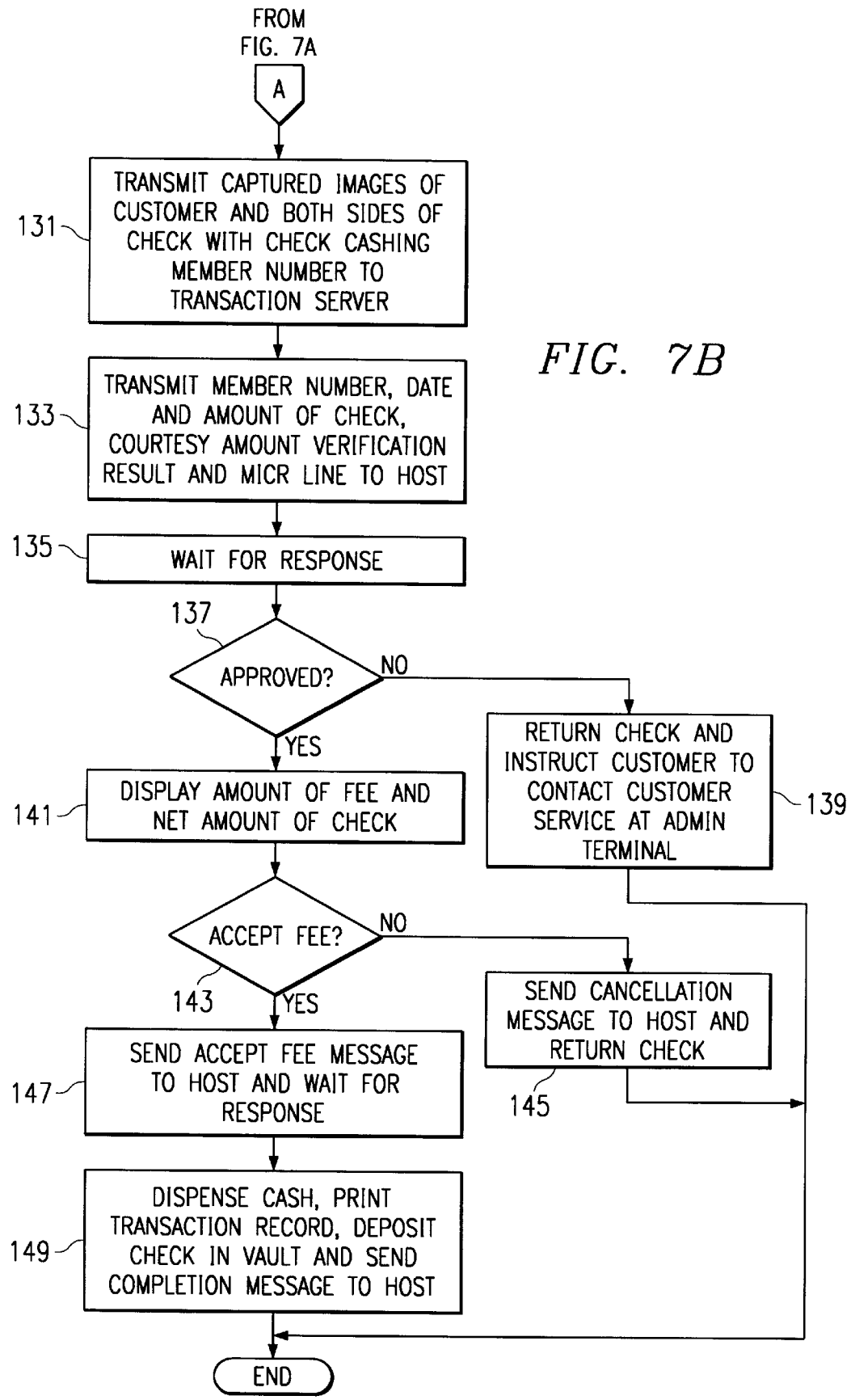

SELF SERVICE METHOD OF AND SYSTEM FOR CASHING CHECKS

FIELD OF THE INVENTION

The present invention relates generally to electronic commerce, and more particularly to a self service automated method of and system for cashing checks.

DESCRIPTION OF THE PRIOR ART

Employers and social service agencies provide compensation and benefits to their employees and clients typically either by check or by direct deposit to the employee or client's bank account. It is not typical for employers and social service agencies to provide compensation or benefits to their employees and clients in cash. While the majority of individuals have bank accounts into which they can deposit checks, a substantial minority of individuals do not have any bank account at all.

People without bank accounts must convert their checks to cash. One way of converting a check to cash is to cash the check at the bank upon which the check is drawn. However, it may not always be convenient or even possible for an individual to travel to the appropriate bank location. More typically, people without bank accounts cash their checks at commercial check cashing agencies or services. Check cashing services operate either at free standing retail locations, or as concessions within a larger retail establishment.

A check cashing service location requires trained and reliable personnel. Additionally, a check cashing location requires a relatively large floor space and has a relatively high installation cost. The employment and space considerations make a check cashing location a relatively expensive operation. Accordingly, in order to be profitable, a check cashing service must charge relatively high fees and conduct a large volume of check cashing transactions.

There have been suggestions to automate the check cashing process. For example, Lipkin, U.S. Pat. No. 5,592,377 discloses a check cashing system that includes multiple customer terminals and an operator terminal. During each transaction, the customer terminal transmits images of the customer, customer identification material, and both sides of the check to the operator terminal and sets up a two-way voice connection between the customer and the operator. The operator makes a decision whether or not to cash the check. If the operator decides to cash the check, the operator actuates the customer terminal to dispense cash to the customer.

Similarly, Granzow et al. U.S. Pat. No. 4,617,457 discloses a system in which images of the check are transmitted to a teller who makes the decision whether or not to cash the check. Granzow et al. U.S. Pat. No. 4,580,040 discloses a system that is similar to the Granzow et al. '457 patent but in which the check to be cashed is physically transported to the teller.

All of the foregoing automatic cash systems emulate a face-to-face check cashing transaction between a customer and an operator. In each transaction, the customer identifies himself to the teller and the teller makes a decision, at the time of the transaction, whether or not to cash the check. Thus, a teller must be available for each transaction and each transaction requires a substantial amount of time.

SUMMARY OF THE INVENTION

The present invention provides an automated method of and system for cashing registered checks for registered customers, typically without human intervention. The system includes a check cashing database that contains customer records for registered customers. Each customer record includes customer information, including an image of the registered customer and certain information about the customer, such as address, employer, etc., and check information, including account number, a check image, and check period and amount, for each registered check for a registered customer. Each registered customer is identified by a unique identifier, such as a check cashing member number.

The system includes a plurality of administration modules with which individuals may register themselves and their checks and communicate with customer service representatives. Preferably, the administration modules are implemented in free standing administration terminals. Each administration module includes a display for displaying information and prompts to a user, and user input devices, including a keypad and/or touch screen and a digital scanner, for receiving information from the user. Each administration module also includes a video or digital camera for capturing an image of the user and for use in video call switching. A telephone is provided for enabling the user to speak to a customer service representative. A printer is provided for printing registration forms, check cashing member identification number information, transaction records, and the like.

The administration modules communicate with one or more customer service modules. The customer service modules are implemented in personal computer workstations operated by customer service representatives who enter customer and check registration information into the check cashing database and send check cashing member numbers to the administration modules. The customer service representatives initiate background and employment checks and, upon receiving favorable information on the customer, activate the customer's check cashing member number, which enables the customer to cash checks.

The system includes a plurality of check cashing transaction modules with which registered customers may cash registered checks. The check cashing transaction modules are preferably implemented in free standing check cashing modules separate from the administration modules. Each check cashing transaction module includes a display for displaying information and prompts to a customer, and user input devices, including a keypad and/or touch screen, for receiving information from the customer. Each check cashing transaction module also includes a video or digital camera for capturing an image of the customer. The check cashing transaction module includes a check receiver that holds the check during processing. The check receiver includes a check scanner and a MICR reader. The check cashing transaction module includes optical character recognition (OCR) software. The check cashing transaction module includes a cash and coin dispenser. A printer is provided for transaction receipts and the like.

Each check cashing transaction module receives information from a customer and performs certain transaction processing operations. The check cashing transaction module prompts the customer to enter a check cashing member number, the date and amount of the check to be cashed, and captures a image of the customer. The check cashing transaction module prompts the customer to insert the check to be cashed into the check receiver, where both sides of the check are scanned and the MICR line is read. The check cashing transaction module compares the amount entered by the customer with digits amount read by the OCR software and verifies that the check is signed and endorsed. The check cashing transaction module ejects the check if check is not endorsed or the module cannot read a MICR line.

The system includes a check cashing server that communicates with the check cashing transaction modules. The check cashing server receives check cashing requests from the check cashing transaction modules. The transaction requests include the customer's check cashing member number, the date and the amount of the check to be cashed, and the number of the account upon which the check was drawn, as determined from the magnetic ink characters on the check. The check cashing server also receives captured images of the customer and both sides of the check, which the check cashing server stores in the check cashing database. The check cashing server processes check requests by comparing information in the request with criteria derived from the check cashing database. If the check request satisfies the criteria, the check cashing server, without human action or intervention, instructs the check cashing transaction module to dispense cash to the customer.

The system includes one or more teller modules that are operated by tellers. The teller modules are implemented in the personal computer workstations that may be same physical machines as those in which the customer service modules are implemented. In the event a check request does not satisfy the criteria derived from the check cashing database, the check cashing server forwards the check cashing request to a teller module. The teller module displays the image of the registered customer and the image captured by the transaction module, along with the captured images of both sides of the check and registered check information. The teller can actuate the teller module to send an approval or a disapproval message to the check cashing server.

BRIEF DESCRIPTION OF THE DRAWINGS

FIGS. 7A and 7B comprise a flowchart of transaction module processing according to the present invention.

DESCRIPTION OF THE PREFERRED EMBODIMENT

Figure 1:
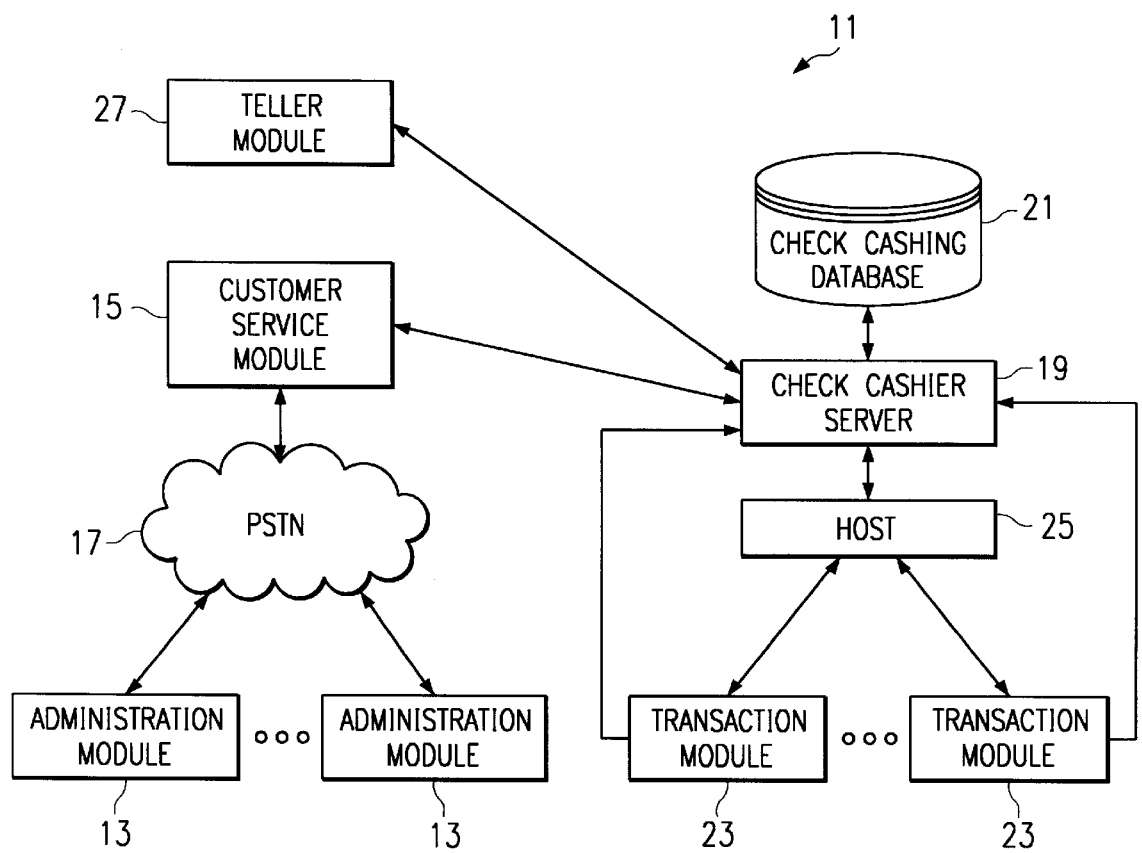
FIG. 1 is a block diagram of a check cashing system according to the present invention.
Figure 2:
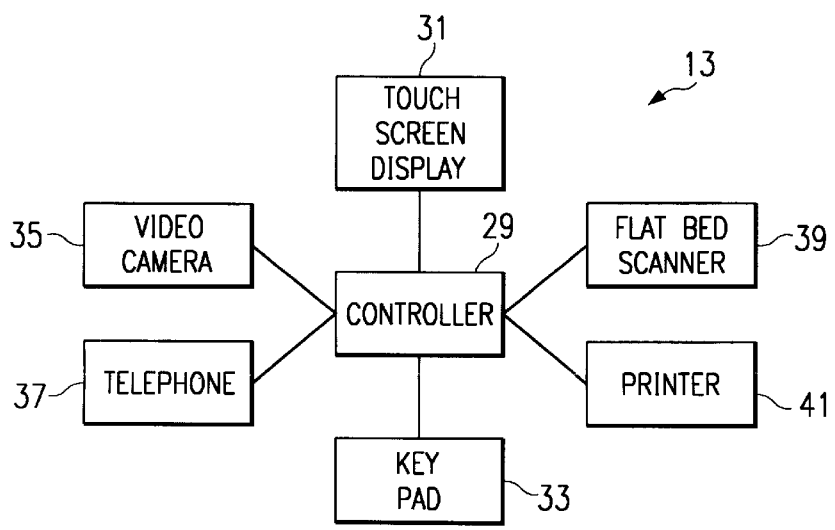
FIG. 2 is block diagram of an administration terminal according to the present invention.

Referring now to the drawings, and first to FIG. 1, a high level block diagram of the system of the present invention is designated generally by the numeral 11. System 11 includes a plurality of administration modules, which in the preferred embodiment are implemented in free standing administration terminals 13, as illustrated in FIG. 2. Each administration module provides a means by which a customer can register himself and checks that he expects to receive. A customer may register check of any type, but most commonly registered checks will include those that are issued on a regular periodic basis for substantially the same amount, such as payroll checks, social security checks, and the like.

Administration modules 13 are connectable to one or more customer service modules 15 by ISDN and frame relay connections through a public switched telephone network 17 to transmit voice, video, and character and image data back and forth between administration modules 13 and customer service module 15. Customer service module 15 is preferably implemented in a personal computer or workstation with telephone and video interfaces in a local area network environment. Customer service module 15 is operated by a customer service representative. The customer service representative communicates through customer service module 15 with customers at administration modules 13. The customer service representative inputs customer and check registration information through customer service module 15 to a check cashing server 19, which maintains a check cashing database 21.

Each customer is identified by a unique check cashing member number, which is assigned at registration and communicated to the customer by the customer service representative through the customer service module 15 and administration module 13. The customer service representative can view and update customer and transaction records stored in check cashing database 21 through customer service module 15.

A customer must register himself and each check type that he intends to cash using the system of the present invention. A check type includes checks drawn on a specified account for a fixed amount, or for a range of amounts, typically on a regular periodic basis. Once a registered customer has registered a check type, the customer can cash checks of that type without further human intervention.

The system includes a plurality of transaction modules. Transaction modules are preferably implemented in transaction terminals 23 of the type illustrated with respect to FIG. 3. Preferably, transaction modules 23 are implemented in terminals that are separate from the terminals of administration modules 13, although both could be implemented in the same physical piece of equipment. Typically, the terminal of administration terminals 13 and transaction terminals 23 would be located near each other, but physical proximity is not required, and the number of transaction terminals 23 supported by system 11 does not need to be the same as the number of administration terminals 13.

As will be described in detail hereinafter, the actual check cashing transactions according to the present invention are performed through transaction modules 23. Transaction modules 23 communicate with check cashing server 19. In the preferred embodiment, transaction modules 23 are implemented in modified automatic teller machines (ATMs) and in an architecture of the type described in copending application Ser. No. 08/934,446, filed Sep. 19, 1997. In the preferred embodiment, image data is communicated from each transaction module 23 directly to check cashing server 19 directly through FTP interfaces and character data is communicated back and forth between transaction modules 23 and transaction server 19 via frame relay connections through a host system 25.

As will be explained in detail hereinafter, a customer initiates a specific check cashing transaction at a transaction module 23. The customer enters his check cashing member number and the amount and date of the check to be cashed into transaction module 23. The customer also inserts the check to be cashed into a check receptacle in transaction module 23. Transaction module 23 captures an image of the customer, scans both sides of the check, and transmits the captured and scanned images to check cashing server 19 along with the customer check cashing member number. Transaction module 23 performs optical character recognition (OCR) on the courtesy amount of the check and verifies that the check is signed by the maker and endorsed by the customer. Transaction module 23 also transmits the information entered by the customer and magnetic ink character recognition (MICR) information read from the check to check cashing server 19 through host 25. Check cashing server 19 stores the image data in check cashing database 21 and processes the character data to determine whether or not to cash the check. As will be explained in detail hereinafter, if the check meets predefined criteria, check cashing server 19 automatically, and without human intervention, signals transaction module 23, through host 25, to dispense cash to the customer. If check cashing server 19 determines the check not to be valid, check cashing server 19 signals transaction module 23 to return the check uncashed to the customer.

Occasionally, an apparently valid check will fail to meet the defined criteria for automatically cashing a check. For example, a payroll check may include overtime that makes the amount of the check greater than the amount registered for the check type. In such cases, check cashing server 19 forwards the check request to a teller module 27 for action by a human teller. Teller module 27 is preferably implemented in a personal computer or workstation in a LAN environment, which may be the same physical machine in which a customer service module 15 is implemented. Teller module 27 enables a teller to view the images of the customer and both sides of the check received from transaction module 23 and the image of the customer stored in check cashing database 21 and information regarding the registered check. The teller has discretion to approve or disapprove cashing the check.

Referring now to FIG. 2, there is shown a block diagram of a administration module 13 according to the present invention. Administration module 13 includes a microprocessor controller 29 that runs a suitable operating system and appropriate device drivers, as well as administration software that will be described in detail hereinafter. The user interface to administration module 29 includes a touch screen display 31 and a keypad 33. In the manner well known to those skilled in the art, menus and selection choices are presented to the user on display screen 31 and user inputs selections and other data are received by controller 29 by touch screen and/or keypad entry. Administration module 13 includes a video or digital camera 35 for capturing an image of a customer using administration module 13. A telephone 37 is provided for enabling a customer to have a fully interactive voice and video conversation with a customer service representative.

Administration module 13 includes a scanner, which in the preferred embodiment is a flat bed scanner 39, although other types of scanners may be used. As will explained in detail hereinafter, a substantial amount of information is collected in connection with registering a check. One of the ways the information is collected is by means of a written form that a customer can complete and sign before initiating a session with a customer representative. In such case, registration information is provided to the customer service representative by scanning the completed form. Alteratively, the customer can provide the registration information to the customer service representative either verbally over telephone 37 or by entering information with keypad 33 or touch screen display 31. In every case, it is necessary that the customer sign a registration form and scan the customer's signature into the database. Accordingly, if the customer completes the form verbally over telephone 37 or manually with touch screen 31 or keypad 33, administration module 13 prints a blank copy of the form with the printer 41. The customer is instructed to sign the printed form and scan it with flatbed scanner 39. Printer 41 is also adapted to print check cashing member numbers. The check cashing member number may be printed on a wallet sized card for convenient carrying by the customer, but the present invention does not require a check cashing card, per se.

Figure 3:
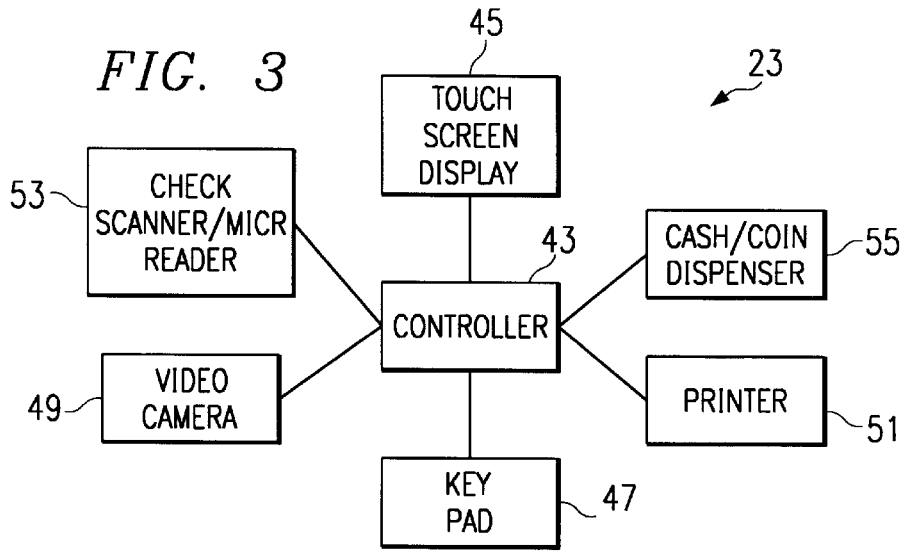
FIG. 3 is block diagram of a check cashing terminal according to the present invention.

Referring now to FIG. 3, there is shown a transaction module 23. Transaction module 23 is similar to administration module 13 in that it includes a microprocessor controller 43, a touch screen display 45, a keypad 47, a video or digital camera 49, and a printer 51. Additionally, transaction module 23 includes a check receptacle that includes a combination OCR capable check scanner/MICR 53. The check receptacle is adapted to hold the check during the transaction and to scan and perform OCR on both sides of the check and read the MICR line of the check. If the check is cashed during the transaction, the check receptacle deposits the check into a vault (not shown). If the check is not cashed, the check receptacle returns the check to the customer. If the check is cashed, transaction module 23 dispenses the amount of the check, less a service charge, to the customer with the cash/coin dispenser 55. Transaction module 23 prints receipts and other transaction records with printer 51.

Figure 4:
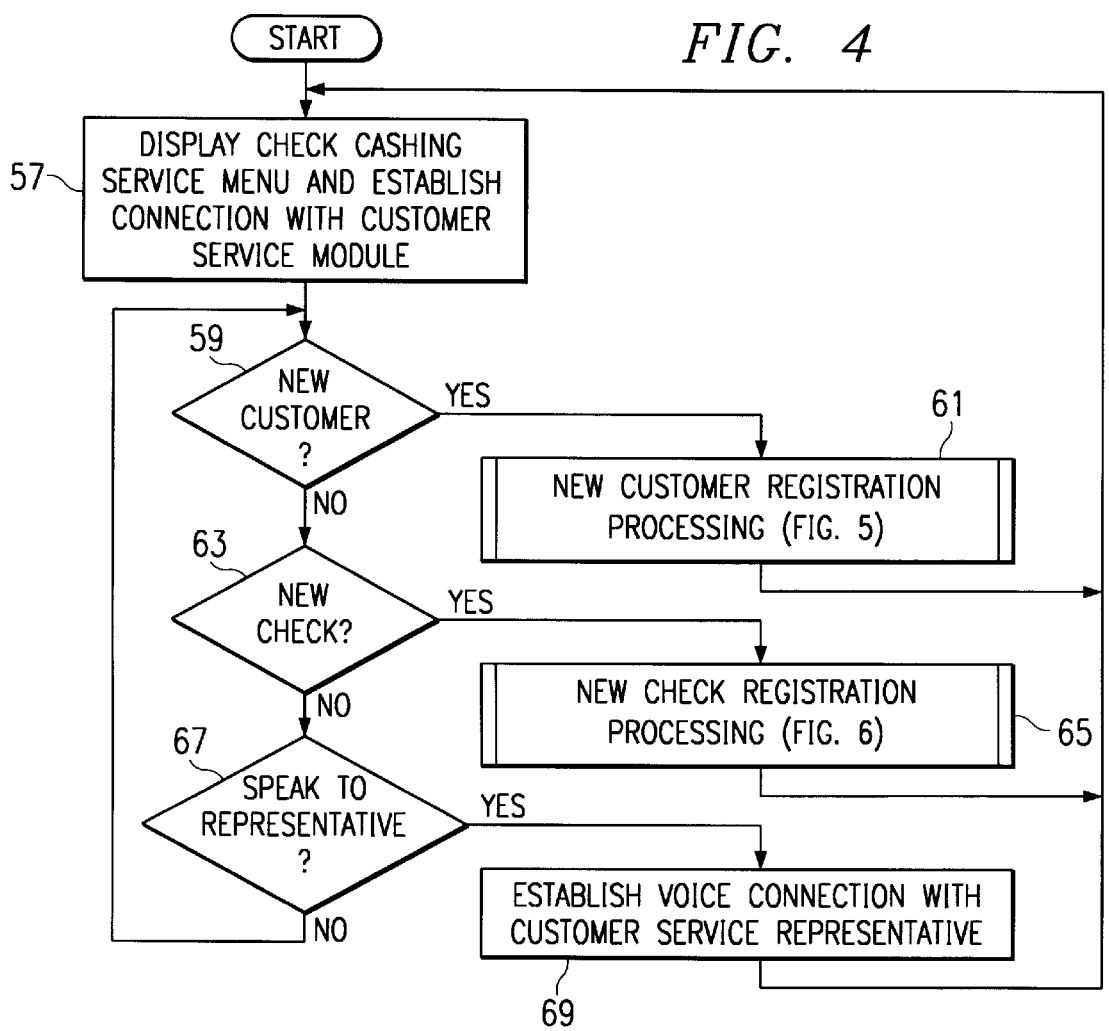
FIG. 4 is a flowchart of administration module processing according to the present invention.

Referring now to FIG. 4, there is shown a high level flow chart of administration module processing in the check cashing system of the present invention. Upon actuation, the administration module displays a check cashing service menu and establishes an off-line connection with a customer service module, at block 57. The system of the present invention includes appropriate means for queuing and routing of communications to an appropriate customer service module, although an interactive session is established only at an appropriate time. The check cashing service menu includes three user selections. If, at decision block 59, the customer selects the new customer menu choice, then the administration module performs new customer registration processing, indicated generally at block 61, and shown in detail in FIG. 5. If the user selects the new check menu choice, at decision block 63, the administration module performs new check registration processing, indicated generally at block 65, and shown in detail in FIG. 6. The customer, as indicated at decision block 67, may speak to a customer service representative, in which case the administration module establishes a video conference telephone connection with a customer service representative, at block 69.

Figure 5:
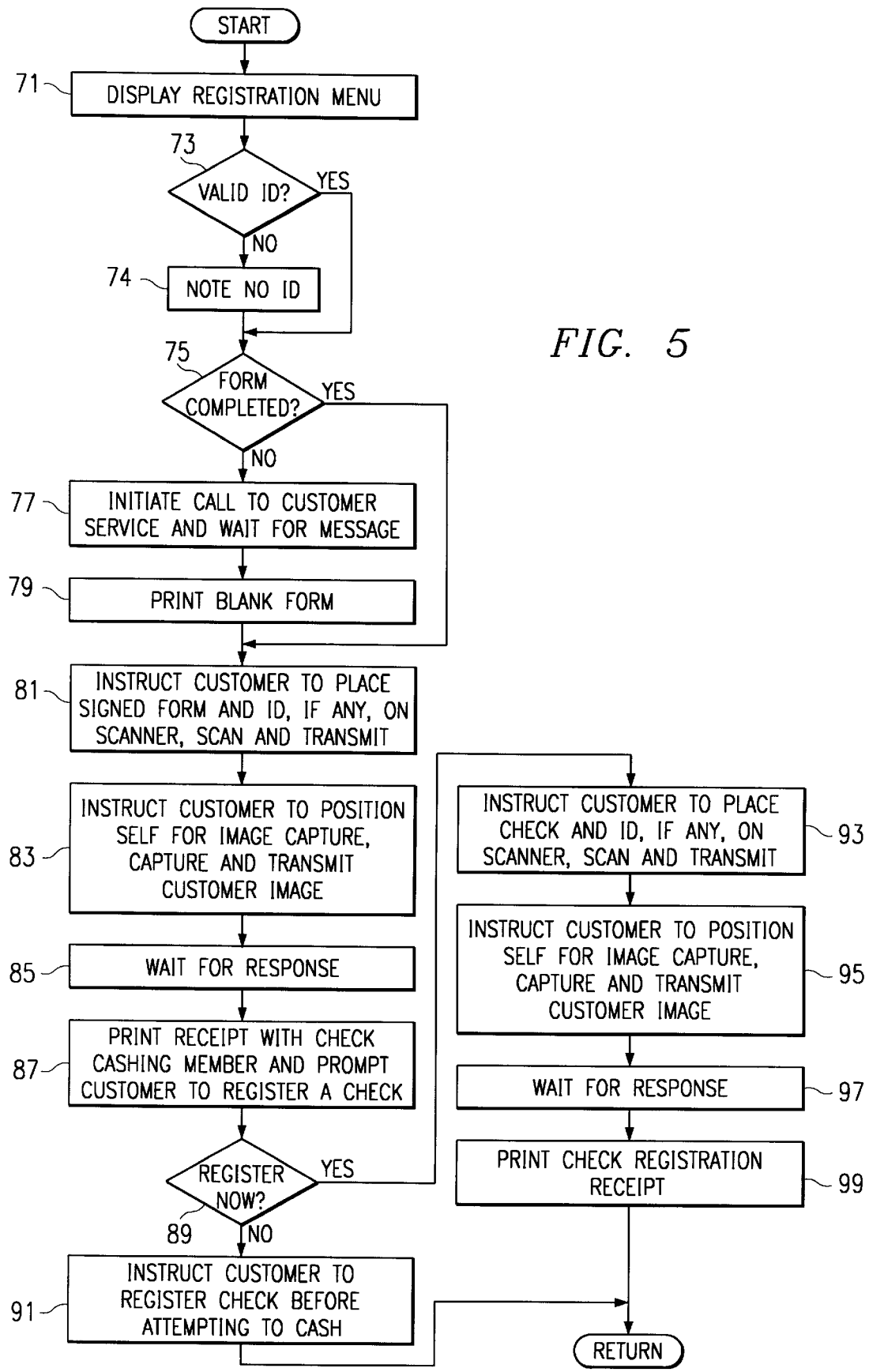
FIG. 5 is a flowchart of new customer registration processing of FIG. 4.

Referring now to FIG. 5, there is shown a flow chart of new customer registration processing performed at an administration module. First, the administration module displays a registration menu, at block 71. The registration menu queries the customer whether or not the customer has valid form of identification, such as a driver's license, at decision block 73. If not, the registration module notes that the customer has no ID, at block 74. According to the present invention, an ID for a customer is optional; however, there is a higher risk associated with cashing check for customers without IDs, which is reflected in increased fees charged to such customers. The registration menu queries the customer whether or not the customer has completed a registration form, at decision block 75. If not, the administration module initiates a call to the customer service module and waits for a print message, at block 77. A customer service representative then records the customer registration information from the customer. At the conclusion of the call, the customer service representative instructs the customer to sign a blank registration form that will be printed by the administration module and sends a print message to the administration module. The administration module prints a blank form, at block 79.

At block 81, the administration module instructs the customer to place the signed registration form with his ID, if any, on the scanner. Then the administration module actuates the scanner and transmits the scanned image to the customer service module, with a notation if the customer has no valid ID, as determined at decision block 73. Then, the administration module instructs the customer to position himself to be photographed, captures an image of the customer, and transmits the captured image to the customer service module, at block 83, and waits for a response, at block 85.

When the customer service module receives images of the signed registration form and the customer, a customer service representative obtains a check cashing member number from the check cashing database and transmits it back to the administration module. When the administration module receives the check cashing member number, it prints record of the number for the customer and instructs the customer to register a check, at block 87.

Initially, the check cashing member number is not active. The customer service representative initiates a background and employment checking procedure. If the results of the checks are satisfactory, then the customer service representative activates the check cashing member number. A customer cannot cash checks until the check cashing member number is activated.

Continuing with FIG. 5 processing, the administration module determines, at decision block 89, whether or not the customer has a check to register. If not, the customer is instructed to return with a check to register before attempt to cash a check, at block 91, and processing ends. If the customer has a check to register, the customer is instructed to place the front side of the check and his ID, if any, on the scanner, which scans and transmits images of the check and ID to the customer service module, at block 93. Then, the administration module instructs the customer to position himself to be photographed, captures an image of the customer, and transmits the captured image to the customer service module, at block 95, and waits for a response, at block 97. Upon receiving a response, the administration module prints a check registration receipt, at block 99, and processing ends.

Figure 6:
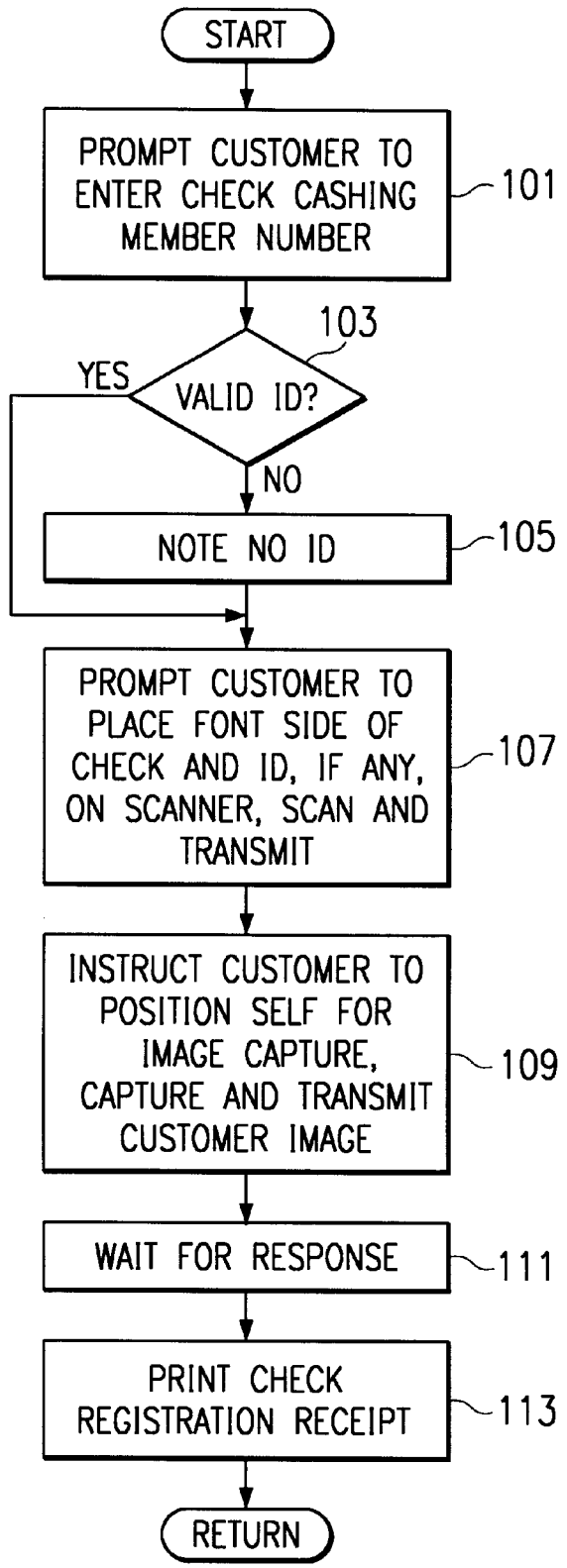
FIG. 6 is a flowchart of new check registration processing of FIG. 4.

Referring now to FIG. 6, there is shown a flow chart of new check registration processing, which is indicated generally at block 65 of FIG. 4. The administration module prompts the customer to enter a check member number, at block 101. Then, the customer is queried whether or not he has a valid ID, at decision block 103. If not, the absence of a valid ID is noted at block 105. Then, the customer is instructed to place the front side of the check and his ID, if any, on the scanner, which scans and transmits images of the check and ID to the customer service module, at block 107. Then, the administration module instructs the customer to position himself to be photographed, captures an image of the customer, and transmits the captured image to the customer service module, at block 109, and waits for a response, at block 111. Upon receiving a response, the administration module prints a check registration receipt, at block 113, and processing ends.

Figure 7A:
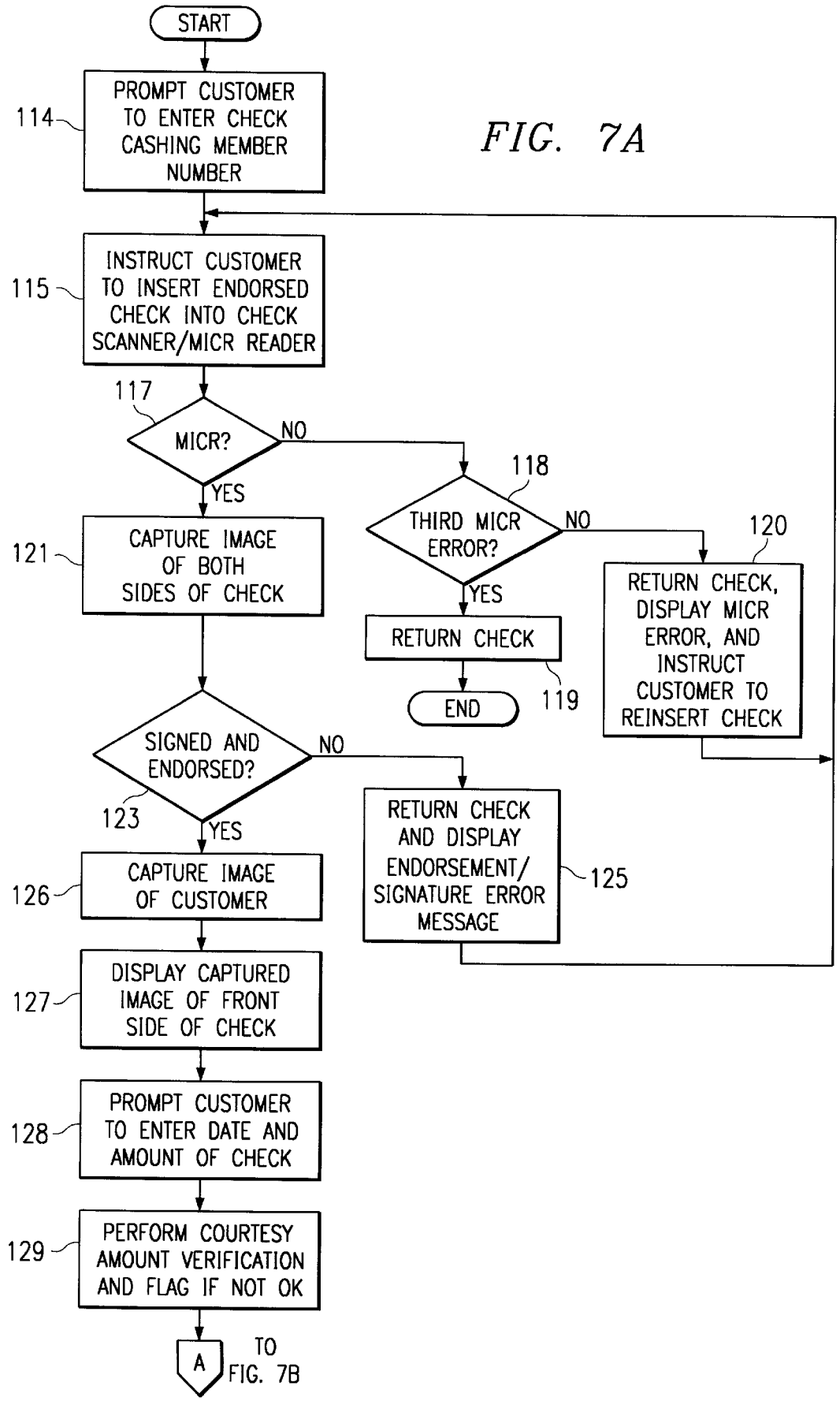

Referring now to FIG. 7A, there is shown a flow chart of transaction module processing. First, the transaction module prompts the customer to enter a check cashing member number, at block 114. Then, the transaction module instructs the customer to insert the endorsed check into the check scanner/MICR reader, at block 115. If, at decision block 117, the transaction module does not detect a MICR line on the check, the transaction module determines whether it has detected two previous MICR errors for the check, at decision block 118. If so, the transaction module returns the check, at block 119, and processing ends. If the transaction module has not detected two previous MICR errors, the transaction module returns the check and instructs the customer to reinsert the check, at block 120. If, at decision block 117, the transaction module detects a MICR line, the transaction module scans the check and captures images of both sides of the check, at block 121. Then, the transaction module tests, at decision block 123 whether or not the check is signed and endorsed. If not, the transaction module returns the check and displays a signature or endorsement error, at block 125, and returns to block 115 to instruct the customer to insert the endorsed check into the check scanner/MICR reader. If, at decision block 123 the transaction module detects a signature and an endorsement, then the transaction module captures an image of the customer, at block 126, and displays the captured image of the front side of the check, at block 127. Then, the transaction module prompts the customer to enter the date and amount of the check, at block 128, and performs courtesy amount verification, at block 129. Courtesy amount verification involves performing OCR on the digits amount of the check and comparing that result with the amount entered by the customer at block 128. The transaction module flags the check for teller attention if the courtesy amount does not match the amount entered by the customer.

Referring now to FIG. 7B, after the transaction module has performed courtesy amount verification, the transaction module transmits the captured images of the customer and both sides of the check with the check cashing member number to the transaction server, at block 131, and transmits the check cashing card number, the date and the amount of the check, the courtesy amount verification result, and the MICR line to the host, at block 133. Then, the transaction module waits for a response, at block 135.

The transaction module tests, at decision block 137, whether or not the response from the host is an approval. If not, the transaction module returns the check to the customer and instructs the customer to contact customer service, at block 139. If the response from the host is an approval, then the transaction displays the amount of the fee and the net amount of the check, at block 141, and prompts the customer either to accept or decline the fee. If, at decision block 143, the customer declines the fee, then the transaction module sends a cancellation message to the host and returns the check, at block 145. If the customer accepts the fee, then the transaction module sends an accept fee message to the host and waits for a response, at block 147. Upon receiving a response from the host, the transaction module dispenses the cash, prints a transaction record, deposits the check in the vault, and sends a completion message to the host, at block 149, and transaction module processing ends.

Figure 8:
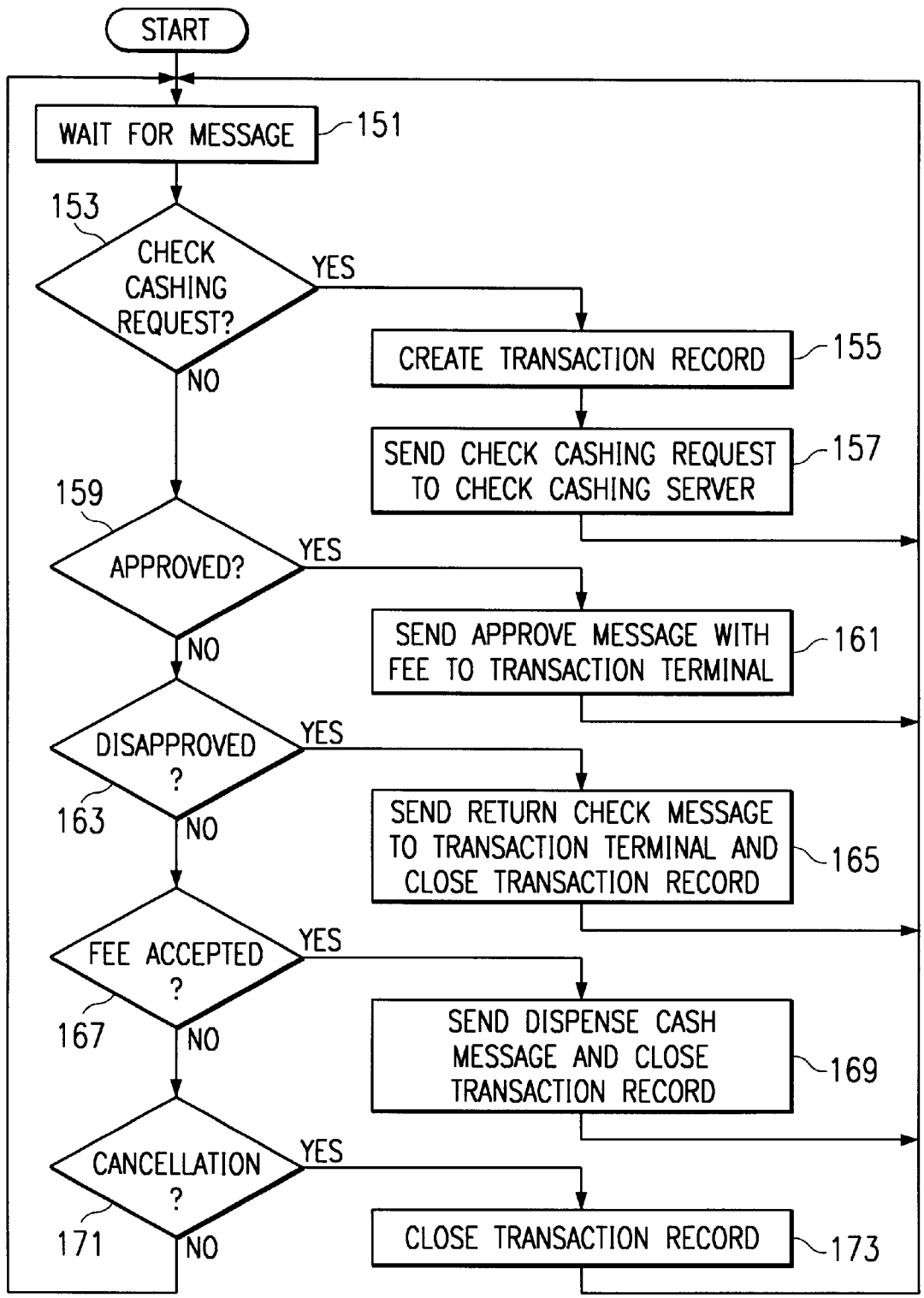
FIG. 8 is a flowchart of host processing according to the present invention.

Referring now to FIG. 8, there is shown a flow chart of processing that occurs at the host. The host waits for messages at block 151. If, at decision block 153, a message is a check cashing request, the host creates a transaction record, at block 155, transmits a check cashing request to the check cashing server, at block 157. If, at decision block 159, the message is an approval message from the check cashing server, the host sends an approve message with a fee to the transaction module, at block 161. If, at decision block 163, the response is a disapproval message from the check cashing server, the host sends a return check message to the transaction module and closes the transaction record, at block 165. If, at decision block 167, the message is a fee accepted message from the transaction module, the host sends a dispense cash message to the transaction module and closes the transaction record at block 169. If, at decision block 171, the message is a cancellation from the transaction module, the host closes the transaction record, at block 173.

Figure 10:
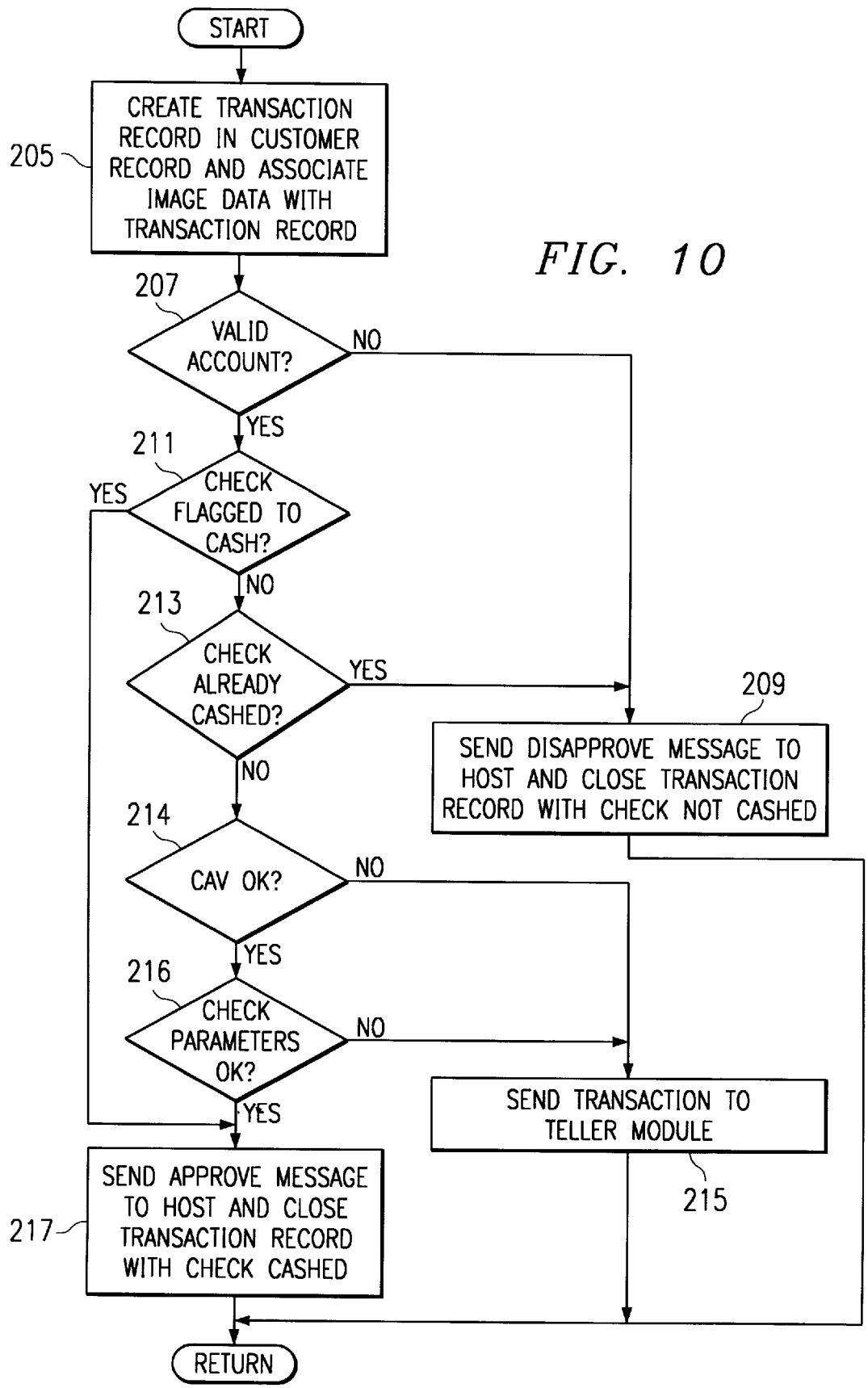
FIG. 10 is a flowchart of check cashing request processing of FIG. 9.

Referring now to FIG. 10, there is shown a flow chart of check cashing server processing. The check cashing server waits for messages, at block 175, that deal either with registration processing or check cashing transaction processing. If, at decision block 177, the message is a new customer registration, the check cashing server creates a customer record and sends a check cashing card number to the customer service module, at block 179. The transaction server stores the customer record identified by the check cashing card number in the check cashing database.

If, at decision block 181, the message is an activation message from the customer service module, the check cashing server activates the appropriate customer record in the check cashing database, at block 183. If, at decision block 185, the message is a new check registration, the check cashing server stores the new check information in the check cashing database, at block 187.

The remaining messages deal with actual check cashing transaction processing. If, at decision block 189, the message is an image from a transaction module, the check cashing server stores the image data in the customer record identified by the check cashing card number attached to the image message, at block 191. If, at block 193, the message is a check cashing request from the host, the check cashing server performs check cashing request processing, as indicated generally at block 195 and shown in detail in FIG. 10. If, at decision block 197, the message is an approval from a teller module, the check cashing server sends an approval message to the host and closes the transaction message with the check cashed, at block 199. If, at decision block 201, the message is a disapproval from a teller module, then the check cashing server sends a disapproval message to the host and closes the transaction record with the check not cashed, at block 203.

Figure 9:
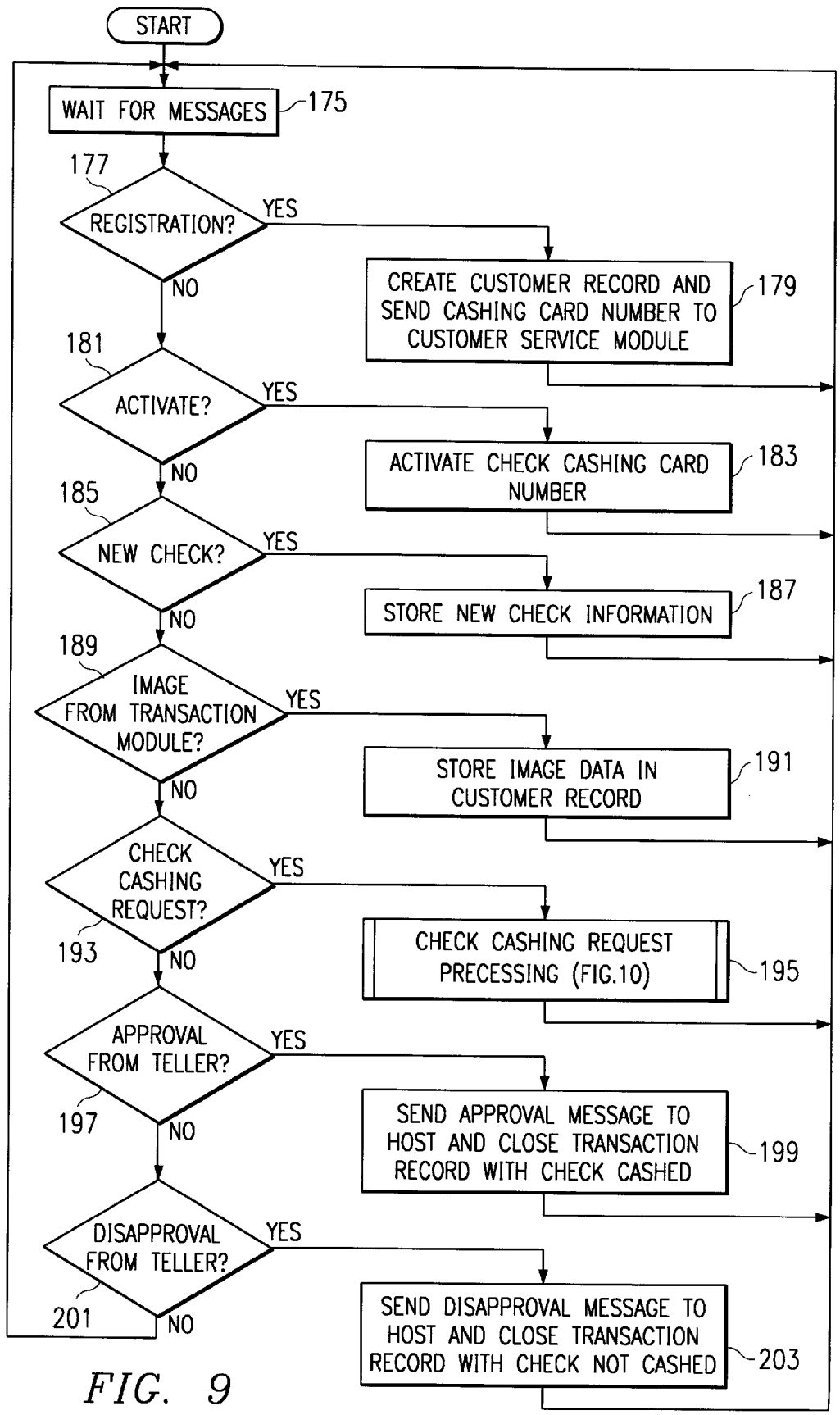
FIG. 9 is a flowchart of check cashing server processing according to the present invention.

Referring now to FIG. 10, there is shown a flow chart of check cashing request processing, which is indicated generally at block 195 of FIG. 9. First, the check cashing server creates a transaction record in the customer record and associates the transmitted image data with the transaction record, at block 205. Then, the check cashing server tests, at decision block 207 whether or not the account is valid. An account is considered not to be valid if the check cashing card number has not yet been activated or if the account number taken from the MICR line does not match the account number stored in the customer record. If the account is determined not to be valid, then the check cashing server sends a disapprove message to the host and closes the transaction record with the check not cashed, at block 209. Referring to block 139 of FIG. 7B, transaction module processing, whenever a check is disapproved, the check is returned to the customer and the customer is instructed to contact customer service at an administration module. A customer service representative can review a customers records in the check cashing database and override a decision not to cash a check by flagging a check to be cashed.

If, at decision block 207, the account is determined to be valid, the transaction server tests, at decision block 211, if the check has been flagged to be cashed. If, at decision block 211, the check is flagged to be cashed, which indicates that a customer service representative has determined that the check should be cashed, not withstanding other processing, the check cashing server sends an approve message to the host and closes the transaction record with the check cashed, at block 215.

If the check has not been flagged to cash, the transaction server tests, at decision block 213, if the check has already been cashed. If the transaction server determines that the check has already been cashed, the transaction server sends a disapprove message to the host and closes the transaction record with the check not cashed at block 209. In such cases, the customer is advised to contact customer service. A customer service representative can enter the check cashing database and flag the check to be cashed.

The check cashing server tests, at decision block 214, whether or not the courtesy amount verification result is OK. If not, the check cashing server forwards the transaction to a teller module, at block 215. A human teller can exercise judgment as to whether or not to cash the check. If the courtesy amount verification result is OK, then the check cashing server tests, at decision block 216, whether or not the check is within parameters as to date and amount. If not, the check cashing server sends the transaction to the teller module for teller intervention, at block 215. If the check is within parameters, the check cashing server sends an approve message to the host and closes the transaction record with the check cashed, at block 217, without human intervention.

From the foregoing, it may be seen that the present invention provides a method of and system for enabling people without bank accounts to cash checks in a self service environment, usually without the involvement of a human teller. The present invention offers several advantages and economies over traditional check cashing services and prior automated check cashing services. A person can register himself and the checks that he expects to receive at any administration module or module at any time of the day or night, usually without any apparent involvement of a human agent. The customer service representatives may be located far from the administration modules. Once the person has registered himself and his check, he can cash a registered check at any transaction module, again at any time of the day or night, automatically and without teller intervention.

What is claimed is:

1. A system for cashing checks, which comprises:
 a check cashing server, said check cashing server including means for processing check cashing requests; and,
 a transaction module, said transaction module including:
  means for receiving a check to be cashed;
  means for transmitting a check cashing request to said check cashing server;
  means for dispensing cash to a customer in response to customer registration information and check registration information collected from the customer and provided to said check cashing server.

2. The system as claimed in claim 1, wherein said transaction module further includes:
 means for capturing an image of a customer attempting to cash said check; and, means for transmitting said captured image of said customer to said check cashing server.

3. The system as claimed in claim 1, wherein said transaction module further includes:
means for capturing an image of at least one side of said check; and,
means for transmitting said captured image of said at least one side of said check to said check cashing server.

4. The system as claimed in claim 1, wherein said transaction module further includes:
user input means for enabling a customer to enter a customer identifier, a check amount, and a check date; and,
means for including said entered customer identifier, check amount, and check date in said check cashing request.

5. The system as claimed in claim 4, wherein said transaction module includes:
means for performing courtesy amount verification on said check;
means for including the result of said courtesy amount verification in said check cashing request.

6. The system as claimed in claim 5, wherein said means for performing courtesy amount verification on said check includes:
means for capturing an image of at least a front side of said check;
means for performing optical character recognition on said captured image of said check; and
means for comparing a result of said optical character recognition with the amount of said check entered by said customer.

7. The system as claimed in claim 1, wherein said transaction module further includes:
means for reading magnetic ink characters on said check; and,
means for transmitting said magnetic ink characters to said check cashing server.

8. The system as claimed in claim 7, wherein said transaction module further includes:
means for returning said check uncashed whenever said transaction module fails to detect magnetic ink characters on said check.

9. The system as claimed in claim 8, wherein said transaction module further includes:
means for instructing said customer to insert said check into said transaction module when said check is returned uncashed in response to failure to detect magnetic ink characters on said check.

10. The system as claimed in claim 1, wherein said transaction module further includes:
means for detecting an endorsement on said check; and,
means for returning said check uncashed whenever said transaction module fails to detect an endorsement on said check.

11. The system as claimed in claim 10, wherein said transaction module further includes:
means for prompting a customer to endorse and reinsert said check into said transaction module.

12. The system as claimed in claim 1, wherein said transaction module further includes:
means for detecting a signature of a maker on said check; and,
means for returning said check uncashed in response to failure to detect a signature on said check.

13. The system as claimed in claim 1, wherein said check cashing server further includes:
means for comparing information in said check request with predefined check cashing criteria; and,
means for transmitting an authorization to said transaction module if said information in said check request matches said predefined check cashing criteria.

14. The system as claimed in claim 13, wherein said check cashing server includes:
means for transmitting said check request to a teller module if said information in said check request fails to match said check cashing criteria.

15. The system as claimed in claim 1, wherein:
said transaction module includes:
means for performing courtesy amount verification on said check; and,
means for including the result of courtesy amount verification in said check cashing request; and said check cashing server includes:
means for comparing information in said check request with predefined check cashing criteria; and,
means for transmitting an authorization to said to said transaction module if said information in said check request matches said predefined check cashing criteria and said courtesy amount verification result is positive.

16. The system as claimed in claim 15, wherein said check cashing server includes:
means for transmitting said check cashing request to a teller module if said information in said check cashing request fails to match said predefined check cashing criteria or said courtesy amount verification result is negative.

17. The system as claimed in claim 1, including:
an administration module, said administration module including means for collecting said customer registration information from a customer and said check registration information from said customer, and said administration module including means for providing said customer with customer identification indicia; and,
a customer service module, said customer service module including means for receiving said customer registration information and said check registration information collected from said customer at said administration module, means for providing said customer and check registration information to said check cashing server, and means for transmitting customer identification indicia to said administration module.

18. A method of cashing a check, which comprises the computer implemented steps of:
prompting a check cashing customer to enter information including a customer identifier, a check amount, and a check cashing date;
prompting said customer to insert said check to be cashed into a holding device; and,
dispensing cash to said check cashing customer without human intervention when the customer identifier entered by said check cashing customer matches a customer identifier for a registered customer stored in a check cashing database and said amount and date entered by said check cashing customer matches defined criteria for a check registered to the registered customer.

19. The method as claimed in claim 18, wherein said check cashing database includes stored images of registered customers.

20. The method as claimed in claim 19, including the computer implemented steps of:

capturing an image of said check cashing customer; and, storing said image of said check customer in said check cashing database.

21. The method as claimed in claim 20, including the computer implemented steps of:

displaying to a teller said image of said check cashing customer and said registered customer identified by said entered customer identifier if said entered check cashing date or amount does not match said defined criteria.

22. The method as claimed in claim 21, including the computer implemented step of:

dispensing cash to said check cashing customer in response to teller authorization.

23. The method as claimed in claim 18, including the computer implemented steps of:

determining if said check is authentic; and, returning said check uncashed if said check is determined not to be authentic.

24. The method as claimed in claim 23, wherein said step of determining if said check is authentic includes the computer implemented step of:

detecting magnetic ink characters on said check.

* * * * *